United States Patent
Rodrigues et al.

(10) Patent No.: US 11,656,337 B2
(45) Date of Patent: May 23, 2023

(54) PHOTONIC APPARATUS INTEGRATING OPTICAL SENSING AND OPTICAL PROCESSING COMPONENTS

(71) Applicant: Toyota Motor Engineering & Manufacturing North America, Inc., Plano, TX (US)

(72) Inventors: Sean Phillip Rodrigues, Ann Arbor, MI (US); Paul Donald Schmalenberg, Ann Arbor, MI (US); Hideo Iizuka, Ann Arbor, MI (US); Jae Seung Lee, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 985 days.

(21) Appl. No.: 16/508,980

(22) Filed: Jul. 11, 2019

(65) Prior Publication Data
US 2021/0012184 A1   Jan. 14, 2021

(51) Int. Cl.
*G06N 3/067* (2006.01)
*G06N 3/08* (2023.01)
(Continued)

(52) U.S. Cl.
CPC .............. *G06N 3/067* (2013.01); *G01S 7/481* (2013.01); *G01S 11/00* (2013.01); *G01S 17/02* (2013.01); *G06N 3/08* (2013.01); *G01C 3/00* (2013.01)

(58) Field of Classification Search
CPC ........ G01S 17/931; G01S 17/02; G01S 7/481; G01S 7/4816; G01S 7/499; G01S 7/4818; G01S 7/4802; G01S 11/00; G06N 3/08; G06N 3/0454; G06N 3/067; G06N 3/0445; G06V 10/82; G06V 10/454; G06V 20/17; G06V 20/13; G06V 20/56; G01C 3/00

See application file for complete search history.

(56) References Cited

U.S. PATENT DOCUMENTS

| 10,078,791 B2 | 9/2018 | Justice et al. |
| 10,126,412 B2 | 11/2018 | Eldada et al. |

(Continued)

FOREIGN PATENT DOCUMENTS

WO   2019064062 A1   4/2019

OTHER PUBLICATIONS

Zhou et al., Self-learning photonic signal processor with an optical neural network chip, available at: arXiv:1902.07318 (2019).

(Continued)

*Primary Examiner* — Sang H Nguyen
(74) *Attorney, Agent, or Firm* — Christopher G. Darrow; Darrow Mustafa PC (57) ABSTRACT

Embodiments described herein relate to a photonic apparatus for processing optical signals within an integrated optical pathway. The photonic apparatus a light perception device that perceives light from a surrounding environment of the apparatus. The photonic apparatus also includes an optical neural network (ONN) connected with the light perception device via an optical relay. The optical neural network configured to perform optical processing on the light according to a deep learning algorithm and using optical components.

11 Claims, 6 Drawing Sheets

(51) Int. Cl.
  *G01S 7/481* (2006.01)
  *G01S 17/02* (2020.01)
  *G01S 11/00* (2006.01)
  *G01C 3/00* (2006.01)

(56) References Cited

U.S. PATENT DOCUMENTS

| | | | |
|---|---|---|---|
| 2016/0125606 A1 | 5/2016 | Justice et al. | |
| 2016/0267669 A1 | 9/2016 | Justice et al. | |
| 2016/0292872 A1* | 10/2016 | Hammond | G05D 1/102 |
| 2017/0351293 A1* | 12/2017 | Carolan | G06N 3/0675 |
| 2018/0067195 A1* | 3/2018 | Slobodyanyuk | G01S 7/4815 |
| 2018/0143628 A1* | 5/2018 | Samper | G05D 1/0061 |
| 2018/0306609 A1* | 10/2018 | Agarwal | G01D 5/00 |
| 2018/0330473 A1* | 11/2018 | Foi | G06T 7/337 |
| 2018/0330474 A1* | 11/2018 | Mehta | G06T 3/4076 |
| 2019/0049967 A1* | 2/2019 | Lim | G05D 1/0088 |
| 2019/0072833 A1* | 3/2019 | Nejadriahi | G02F 1/225 |
| 2019/0094366 A1 | 3/2019 | Maleki et al. | |

OTHER PUBLICATIONS

Shen et al., Deep Learning with Coherent Nanophotonic Circuits, available at: arXiv:1610.02365v1 [physics.optics] Oct. 7, 2016.
Zuo et al. All Optical Neural Network with Nonlinear Activation Functions, available at: arXiv:1904.10819v1 [physics. optics] Apr. 24, 2019.
Neuroqnet.com, retrieved May 13, 2019.
Shastri et al., Principles of Neuromorphic Photonics, available at: arXiv:1801.00016v1 [cs.ET] Dec. 29, 2017.
Tait et al., Neuromorphic photonic networks using silicon photonic weight banks, Sci Rep. Aug. 7, 2017;7(1):7430.
Tezak et al. A Coherent Perceptron for All-Optical Learning, available at: arXiv:1501.01608v2 [quant-ph] Mar. 28, 2015.
Brunner et al. All-optical neuromorphic computing in optical networks of semiconductor lasers, 2016 IEEE International Conference on Rebooting Computing (ICRC).
Iizuka et al., Incident Angle Dependency of Propagating Modes in Rectangular Grating for Polarization-Independent 21st Order Diffraction or Polarization Splitting, available at: https://doi.org/10.1002/mop.25163.
Iizuka et al., Role of propagating modes in a double-groove grating with a +1st-order diffraction angle larger than the substrate-air critical angle, Dec. 1, 2010 / vol. 35, No. 23 / Optics Letters 3973.
Ito et al., Highly efficient—1st-order reflection in Littrow mounted dielectric double-groove grating, AIP Advances 3, 062119 (2013).
Clausnitzer et al. An intelligible explanation of highly-efficient diffraction in deep dielectric rectangular transmission gratings, Optics Express vol. 13, Issue 26, pp. 10448-10456 (2005).

* cited by examiner

PHOTONIC APPARATUS INTEGRATING OPTICAL SENSING AND OPTICAL PROCESSING COMPONENTS

TECHNICAL FIELD

The subject matter described herein relates in general to optical machine perception and, more particularly, to a device that integrates processing and sensing components into a single optical pathway.

BACKGROUND

Machine perception generally involves using some sensing device to generate observations of the surrounding environment. Different devices may use the observations for different purposes such as autonomous operation, surveying, etc. In either case, the process of acquiring the observations involves converting the observations from some analog form (e.g., optical signals) into an electronic format for use by an electronic computing device. In this way, the computing device can then process the information to identify objects in the environment and perform functions according to the observations (e.g., autonomous operation).

However, sensors such as light detection and ranging (LiDAR) sensors generally function in combination with computing devices by converting optical signals (i.e., the perceived optical signals reflected from objects in the environment) into an electronic representation so that the electrical components such as microprocessors, application-specific processors, and other similar components can operate on the data. This processing generally involves localizing objects, tracking targets, identifying objects, and so on. Yet, such architectures are generally expensive due to optical to electrical interconnect designs, consume large amounts of power, and are complex in design due to data high throughput constraints. Thus, the noted constraints generally limit the use of such sensors on mobile platforms.

SUMMARY

An example of a photonic device that integrates optical processing with optical sensing is presented herein. As previously noted, the process of using optics to observe aspects of a surrounding environment generally involves converting observations from an optical analog form as sensed by a device into an electronic format for processing by an electronic processor (e.g., central processing unit (CPU)). However, CPUs and other electronic processing solutions rely on converting the optical observations into an electronic format, and thereby generally suffer from various difficulties associated with power consumption, heat dissipation, design complexity, computational speed, and so on.

Thus, in one approach, a photonic apparatus is disclosed that provides an integrated sensing and processing pathway that uses optics as opposed to converting optical signals into an electronic form for subsequent processing. For example, in one embodiment, a LiDAR integrates processing components within an optical pathway to avoid limitations associated with converting optical signals and performing electronic processing of sensed data. Thus, in one approach, the disclosed photonic apparatus includes a LiDAR that emits light and perceives reflected light from a surrounding environment. In one aspect, the photonic apparatus provides the reflected light embodying observations of the surrounding environment to an optical processing component via an optical relay.

The optical relay functions to, for example, condition the reflected light for subsequent processing. That is, in one embodiment, the optical relay may amplify, filter, and/or generally guide the reflected light from the LiDAR sensor into the optical processing component. Accordingly, the optical relay can condition and guide the reflected light between various components to maintain the reflected light in an original analog format without converting the light into an intermediate electronic form just for processing. Thus, the optical processing component receives the reflected light via the optical relay and performs one or more machine perception functions on the reflected light to produce a result. In one embodiment, the optical processing component is an optical neural network (ONN) that implements a machine perception function such as an object recognition function, a tracking function, a classification function, a semantic segmentation function, and so on.

Accordingly, the ONN can be implemented as a deep learning neural network such as a convolutional neural network, recursive neural network, or another form of artificial neural network that is capable of performing the noted tasks. From an implementation perspective, the ONN, in one or more embodiments, is comprised of a mesh of Mach-Zehnder interferometers, freespace elements, grating couplers, fiber optic bundles, and/or other optical components. Whichever implementation is undertaken, the ONN relies on techniques of optical processing to analyze the reflected light and provide determinations. Thus, the output of the ONN may then be provided to photodetectors that function to translate the optical result of the ONN into an electronic format, which can be processed by electronic computing devices (e.g., autonomous driving modules executing on an electronically-based processor). In this way, the photonic apparatus avoids complexities and computational costs of converting analog optical signals into an electronic form for processing while also improving power consumption, reducing thermal energy dissipation, and also processing the optical sensor data in real-time at the point of collection. As such, the photonic apparatus facilitates edge computing and complex analysis of optical data within the context of a mobile platform such as a vehicle or similar device.

In one embodiment, an apparatus is disclosed. The apparatus includes a light perception device that perceives light from a surrounding environment of the apparatus. The apparatus includes an optical neural network (ONN) connected with the light perception device via an optical relay. The optical neural network configured to perform optical processing on the light according to a deep learning algorithm and using optical components.

In one embodiment, an optical neural network is disclosed. The optical neural network includes a set of inputs that provide light from a source. The ONN includes first gratings that receive the light from the set of inputs and control a direction of the light within the optical neural network in relation to at least one subsequent layer. The ONN includes couplers that receive the light from the first gratings and selectively transmit the light. The ONN includes phase shifters. The couplers and the phase shifters are arranged into alternating layers to process the light according to a deep learning algorithm. The ONN includes second gratings that receive the light from one of the alternating layers and provide the light in a processed form as an output embodying a result.

In one embodiment, a light detection and ranging (LIDAR) apparatus is disclosed. The LIDAR apparatus includes an emitter that transmits light from the LiDAR apparatus into a surrounding environment. The LiDAR apparatus includes a detector component. The detector includes a receiver that receives at least a reflected portion of the light from the surrounding environment. The detector includes a relay connected with an output of the receiver. The relay configured to generate adapted light from the reflected portion of the light for processing. The detector includes an optical processing component connected with the relay to receive the adapted light. The optical processing component performing machine perception processing on the adapted light and providing an electrical signal embodying a result of the machine perception processing.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with a photonic apparatus that integrates an optical sensor with optical processing is disclosed herein. As previously noted, the process of using an optical sensor to observe aspects of a surrounding environment generally involves converting observations from an optical analog form as sensed by a device into an electronic format for processing by an electronic processor (e.g., central processing unit (CPU)). However, CPUs and other electronic processing solutions that rely on converting the optical observations of a sensor into an electronic format generally suffer from various difficulties associated with power consumption, design complexity, and so on. For example, processing approaches such as neural networks that execute on traditional electronically-based architectures (e.g., von Neumann architectures) can be intrinsically limited by properties of those architectures. That is, the architectures generally lack parallel processing abilities or at least implement parallel processing through complex designs, which increases costs, increases power consumption and associated waste heat, and/or decreases throughput. Moreover, such architectures also generally do not co-localize memory and computation, which is another factor that can represent a difficulty to efficiently processing sensor data.

Thus, in one approach, a photonic apparatus is disclosed that provides an integrated sensing and processing pathway. The integrated pathway provides for improvements in relation to the noted difficulties by, for example, improving power consumption and throughput via passive optical processing and other properties of a fully optical sensing and processing pathway. Accordingly, the photonic apparatus leverages optics as a comprehensive approach as opposed to the resource-intensive optical-to-electronic pathway to process the observations.

For example, in one embodiment, the photonic apparatus integrates a light detection and ranging (LiDAR) sensor with optical processing components as a continuous optical pathway. In one or more approaches, the LiDAR is a solid-state LiDAR, a mechanical LiDAR, a flash LiDAR, or another type of LiDAR that is suitable for observing a surrounding environment. In either case, the LiDAR actively emits light and perceives reflected light from the surrounding environment. The photonic apparatus, in one embodiment, provides the reflected light embodying observations of the surrounding environment from the LiDAR to an optical processing component via an optical relay.

In general, the optical relay may take different forms depending on the particular implementation; however, the optical relay generally functions to convey the reflected light from the LiDAR to the optical processing components. Thus, in a simplest form, the optical relay may include an optical fiber and/or silicon photonic waveguide. In further aspects, the optical relay may function to condition/adapt the reflected light for subsequent processing. That is, for example, the optical relay may amplify, filter, and/or generally guide the reflected light from the LiDAR sensor into the optical processing component. Accordingly, the optical relay can condition and guide the reflected light between various components to maintain the reflected light in an original analog format without performing a conversion into an intermediate electronic form for processing.

As such, the optical processing component receives the reflected light via the optical relay and performs one or more machine perception functions on the reflected light to produce a result. Consequently, as opposed to translating large amounts of sensor data from the LiDAR into an electronic form and then processing the data with electronic computing devices to generate the result, the photonic apparatus simply provides determinations embodied in the result, which represent significant reductions in data and computations (and associated computational cost) by avoiding the conversion of the original sensor data.

To achieve this processing, in one embodiment, the optical processing component is an optical neural network (ONN) that implements a machine perception function such as an object recognition function, a tracking function, a classification function, a semantic segmentation function, and so on. Accordingly, the ONN can be implemented as a deep learning neural network such as a convolutional neural network, recursive neural network, or another form of artificial neural network that is capable of performing the noted tasks.

From an implementation perspective, the ONN, in one or more embodiments, is comprised of a mesh of Mach-Zehnder interferometers, phase shifters, freespace elements, grating couplers, fiber optic bundles, and/or other optical components. Whichever implementation is undertaken, the ONN relies on techniques of optical processing to analyze the reflected light and provide determinations. Thus, the output of the ONN may then be provided to photodetectors that function to translate the optical result of the ONN into an electronic format, which can be processed by electronic computing devices (e.g., autonomous driving modules executing on an electronically-based processor) to direct a vehicle action or action of another electronic device. However, as noted, the result of the optical processing represents, in one embodiment, a relatively significant reduction in information in comparison to the raw sensor data perceived by the LiDAR. In this way, the photonic apparatus avoids complexities of converting analog optical signals into an electronic form for processing while also improving power consumption, reducing thermal energy generation and dissipation, and also processing the optical sensor data in real-time at the point of collection. As such, the photonic apparatus facilitates edge computing and complex analysis of optical data within the context of a mobile platform such as a vehicle, robot, drone, or similar mobile/edge device.

Figure 1:
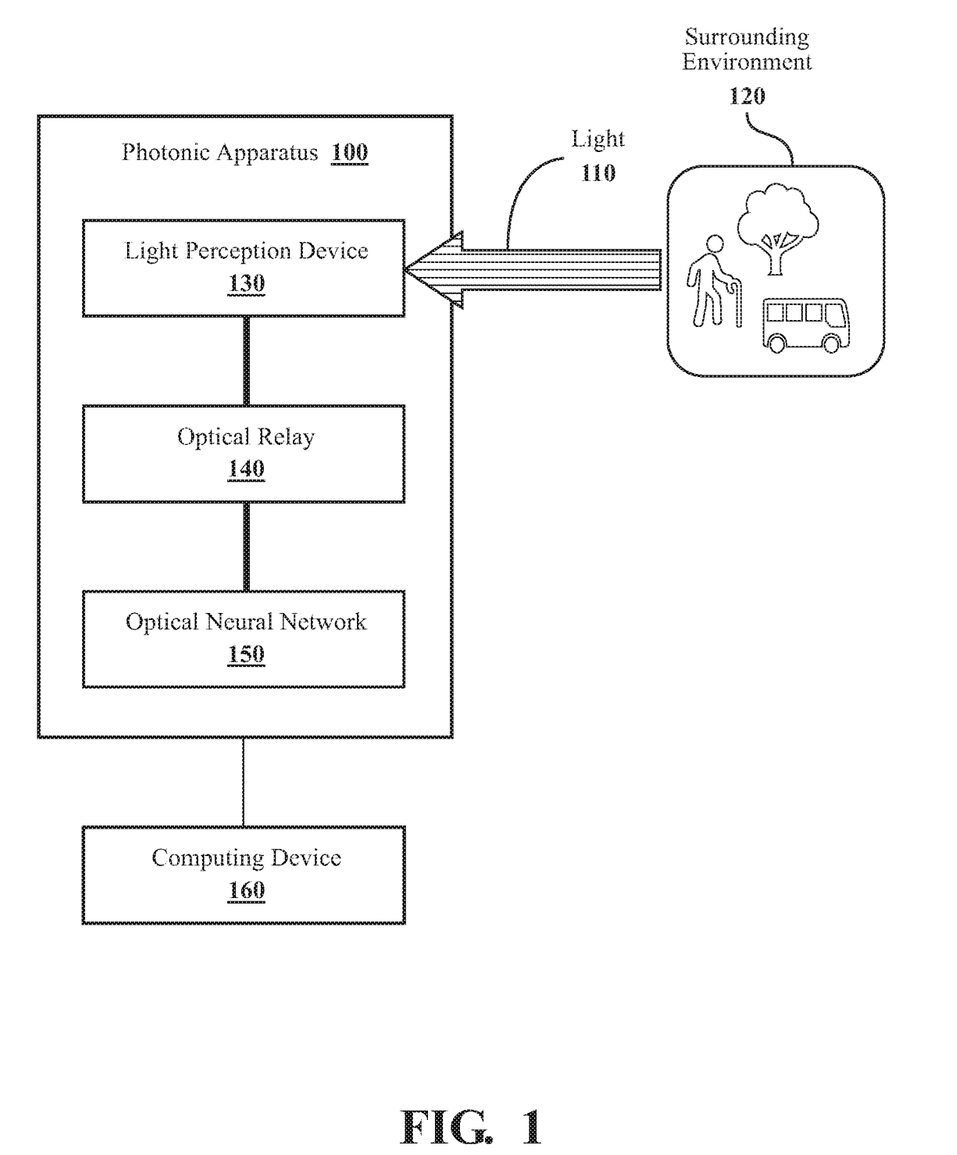
FIG. 1 is a block diagram illustrating one embodiment of a photonic apparatus that includes an integrated optical sensing and processing pathway.

Referring to FIG. 1, an example of a photonic apparatus 100 is illustrated. The photonic apparatus of FIG. 1 is shown in relation to light 110 that is reflected from (and may also be emitted from the photonic apparatus 100) a surrounding environment 120. The disclosed photonic apparatus 100 is generally discussed as being implemented along with electronic devices such as robots, ground-based vehicles, aerial vehicles, drones, and so on to perform various perception tasks; however, it should be appreciated that the disclosed apparatus, devices, etc. can be integrated with the noted machines or can be provided as standalone components. While arrangements will be described herein with respect to automobiles, it will be understood that embodiments are not limited to automobiles. In some implementations, the vehicle may be any other form of powered transport that, for example, benefits from perceptions provided via the photonic apparatus 100. Additionally, as used herein, a "vehicle" is any form of powered transport. In one or more implementations, a vehicle refers to an automobile.

Accordingly, the surrounding environment 120 may be any environment in which the noted machines function. By way of example, one such environment generally involves a transportation environment such as roadways, parking lots, garages, and so on. Moreover, the surrounding environment 120 may also encompass an aviation environment for drones, helicopters, and so on. In still further aspects, the surrounding environment 120 can include indoor environments, off-road environments, and so on.

Additionally, it should be noted that the photonic apparatus 100 is, in one embodiment, a chip-scale silicon photonic device. That is, in one approach, one or more of the components embodied in the photonic apparatus 100 are silicon photonic components provided in the form of a silicon-based chip that may also include electronic control circuitry. Of course, in various approaches, the photonic apparatus 100 may be embodied across multiple silicon photonic devices and/or other components that are operably connected via fiber optics or other optical pathways.

The photonic apparatus 100 also includes various elements. It will be understood that in various embodiments it may not be necessary for the photonic apparatus 100 to have all of the elements shown in FIG. 1. The photonic apparatus 100 can have any combination of the various elements shown in FIG. 1. Further, the photonic apparatus 100 can have additional elements to those shown in FIG. 1. In some arrangements, the photonic apparatus 100 may be implemented without one or more of the elements shown in FIG. 1. Further, while the various elements are shown as being located within the photonic apparatus 100 in FIG. 1, it will be understood that one or more of these elements can be located external to the photonic apparatus 100. Further, the elements shown may be physically separated by varying distances.

Additionally, it will be appreciated that for simplicity and clarity of illustration, where appropriate, reference numerals have been repeated among the different figures to indicate corresponding or analogous elements. The present discussion outlines numerous specific details to provide a thorough understanding of the embodiments described herein. Those of skill in the art, however, will understand that the embodiments described herein may be practiced using various combinations of these elements.

In either case, the photonic apparatus 100 includes a light perception device 130, an optical relay 140, and an optical neural network 150. In one embodiment, the light perception device 130 is a light detection and ranging (LiDAR) sensor. As an initial matter, while the device 130 is generally discussed as a LiDAR sensor, the photonic apparatus 100 can, in further aspects, implement the device 130 as other optical components. For example, in one approach, the device 130 is another optical sensing device. Thus, while the device 130 is generally discussed within the context of being an active sensing device such as a LiDAR, in further aspects, the device 130 may be implemented as a passive sensing device where the photons are not electronically converted but are instead passed to the optical system 140. In either case, the light perception device 130 receives the light 110 that is reflected from the surrounding environment 120.

The light 110 generally represents observations of the surrounding environment 120 and may include, for example, ten percent of the light originally emitted by the device 130. The light 110 generally originates from a laser or other light source associated with an emitter of the device 130. Accordingly, a wavelength and other characteristics of the light 110 can be controlled either dynamically or as a particular aspect of implementation. As a further matter, it should be noted that reference to light waves, optical signals, and light all generally refer to electromagnetic radiation having a particular wavelength. For example, as discussed herein, the light wave is infrared light (e.g., 935 nm, 1550 nm), or another suitable wavelength (e.g., in the visible regime). In further aspects, the particular wavelength of light may be varied according to particular aspects of the implementation. Moreover, the device 130 may also control other characteristics (e.g., phase) of the light 110.

Thus, the environment 120 scatters or otherwise attenuates the emitted light, and the device 130 receives a portion thereof in the form of the reflected light 110. The device 130 receives the light 110 via a set of optics and focuses the light 110 into a set of inputs. The inputs include, in one or more embodiments, separate channels (e.g., 8 input array) corresponding to different elevations of the perceived environment 120. Thus, in the context of a LiDAR sensor that performs a sweeping scan of the environment 120, the device 130 receives slices of the light 110 corresponding with different elevations at each time step and along different degrees of rotation according to the particular time step.

The device 130 focuses the light 110 into corresponding inputs that are optical pathways. Thus, the light 110 represents analog optical signals that are observations of the environment 120. Additionally, instead of immediately converting optical signals into an electronic representation, the light perception device 130 maintains the light 110 as optical signals. Accordingly, the device 130 passes the light 110, in one embodiment, into an optical relay 140. The optical relay 140 may take different forms depending on, for example, a wavelength of light associated with the device 130, a particular platform on which the photonic apparatus 100 is to be deployed, and so on. In either case, the optical relay may include different components depending on an implementation.

Figure 2:
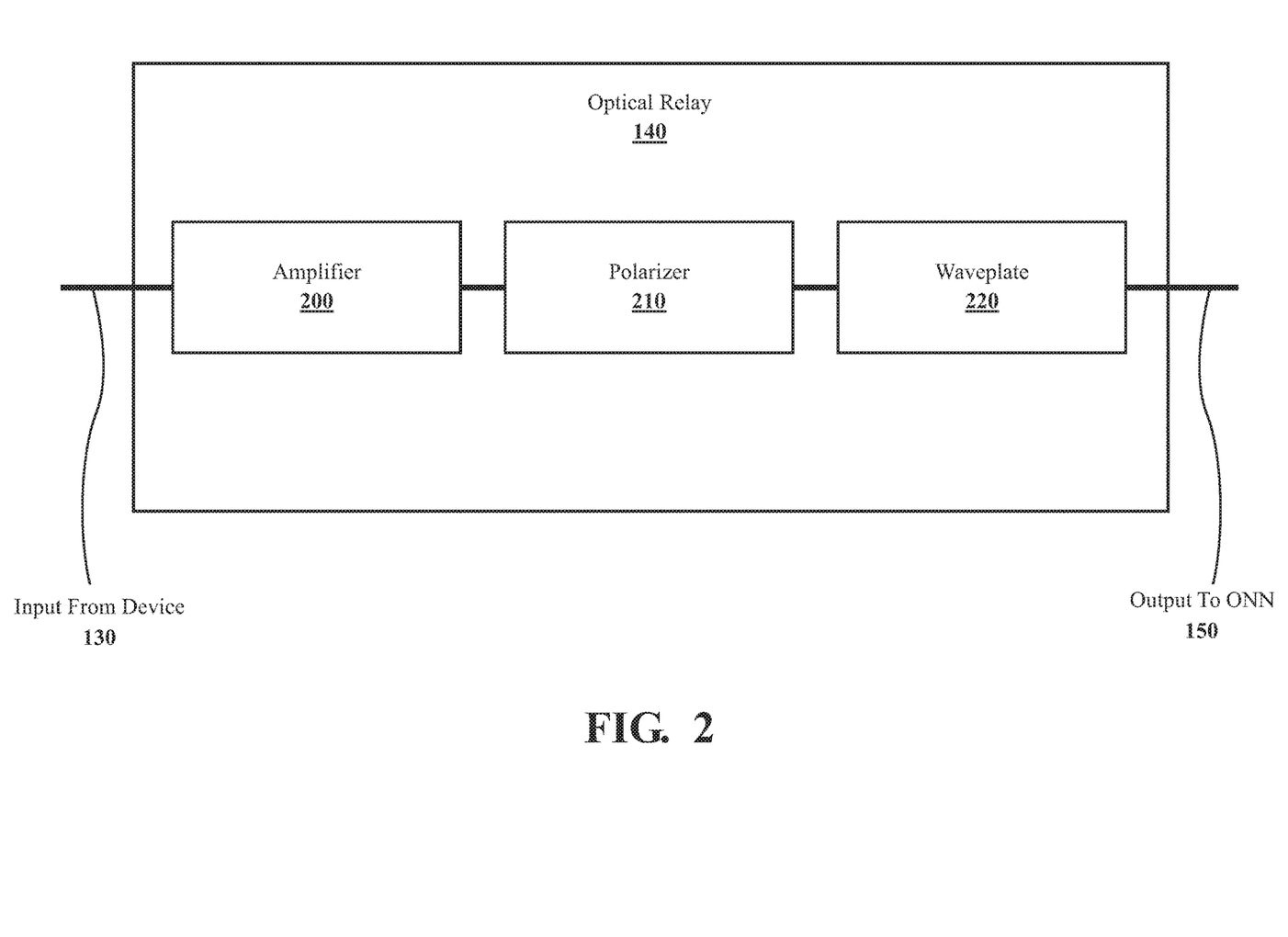
FIG. 2 is a diagram illustrating one embodiment of an optical relay.

FIG. 2 illustrates one embodiment of the optical relay 140. As illustrated in FIG. 2, the optical relay 140 is connected with the device 130 via an optical fiber, silicon photonic waveguide, or another suitable optical pathway. Similarly, the optical relay 140 provides the light 110 or an adapted form thereof to the optical neural network 150 via an optical fiber, silicon photonic waveguide, or another suitable optical pathway. In either case, the optical relay 140 itself includes, in one embodiment, an amplifier 200, a polarizer 210, and a waveplate 220.

As noted previously, because the device 130 may receive the reflected light 110 after having been attenuated in relation to an original form (e.g., 10% of original emitted signal), the amplifier 200 boosts the optical signal in order to provide a signal into the ONN 150 having an improved amplitude. The polarizer 210 filters the optical signal to condition the light 110 to have a consistent polarization, and the waveplate 220 adapts the light 110 from the polarizer 210 such that an output of the relay 140 has a specific selected polarization. Accordingly, the optical relay 140 functions to adapt the light 110 for subsequent processing by the ONN 150 or another optical processing component.

As such, continuing with FIG. 1, the ONN 150 receives the light 110 from the optical relay 140 and processes the light 110 according to a configuration of the ONN 150. That is, the ONN 150 is generally configured in, for example, a static manner according to an arrangement of optical elements therein such as couplers, phase shifters, etc. Thus, as opposed to a software-based neural network that may execute on an electronic processor, the ONN 150 is generally pre-configured, and the base structure of the ONN 150 is, in at least one approach, fixed. As will be discussed in greater detail subsequently, the ONN 150 may be arranged in layers with the separate layers including optical components and successive layers being interconnected in a similar manner as a software-based artificial neural network (ANN) may be abstracted.

Of course, weights of different elements within the ONN 150 may be trained and, in one embodiment, dynamically configured. In other words, the ONN 150 is generally configured for a particular task with a particular arrangement of components to suit that task; however, the weighting of the internal elements can be adjusted according to training on different sets of information. By way of example, the ONN 150 may be configured for a machine learning algorithm that is for object classification. Thus, depending on a particular implementation, the ONN 150 may be trained on different classes of objects. That is, in a transportation context, the ONN 150 would be trained to identify vehicles, pedestrians, traffic signs, and so on. By contrast, the same ONN 150 may be separately trained on indoor objects such as furniture, stairs, etc. when implemented as part of a robotic device that functions within an indoor context. The different training on different classes of objects results in, for example, different internal weights (also referred to as hyper parameters) that generally control transmission efficiency at different nodes in the ONN 150.

For example, in one approach, the ONN 150 is trained by adapting values of phase shifters at different layers and nodes in the ONN 150. The training process may parallel a supervised learning process that uses pre-labeled analog optical data to provide for comparing results generated by the ONN 150 with known values of the pre-labeled data. In one approach, the photonic apparatus 100 further includes, in one embodiment, control circuitry (not illustrated) that actively controls the various phase shifters to adjust the hyper parameters according to training results (e.g., comparison of results with known labels). For example, the control circuitry can tune the phase shifters to provide a particular phase change using thermo-optic controls, electro-optic controls, and/or microelectromechanical-optic controls (MEMs-optic).

That is, in one approach, the control circuitry functions to control a heater (not illustrated) to produce a particular amount of thermal energy, and provide the thermal energy to the phase shifters. Because an amount of phase shift induced within the optical signals propagating through the phase shifters can be controlled as a function of a present temperature, the control circuitry controls the heater to provide thermal energy according to an amount of phase change that is desired. Furthermore, in additional aspects, the phase shifters can be controlled to adjust the phase change using an electro-optic control. Thus, in a similar manner, the control circuitry can control the electro-optic control to adjust the phase change within the phase shifters (e.g., optical waveguides, liquid crystal phase shifters, etc.). In yet another embodiment, MEMs-based devices may be used to mechanically deform the waveguide to produce a similar phase shift through manipulation of the waveguide refractive index. In this way, the photonic apparatus 100 can train the ONN 150 to perform various machine perception tasks.

In any case, the optical perception device 130, the optical relay 140, and the ONN 150 function to acquire and process the reflected light 110 from the environment 120. As such, the ONN 150 generally provides the result of the processing (e.g., labels of identified objects, planned path, etc.) to a computing device 160. Consequently, the ONN 150 can further include photoreceivers at an output layer that convert the result produced by the ONN 150 into an electronic form for subsequent processing by the computing device 160. Thus, the photonic apparatus 100 maintains the perceived light 110 as an analog optical signal throughout an optical pathway including perception processing of the optical signal.

As will be outlined subsequently, the computing device 160 is, in one embodiment, an electronic processor (e.g., CPU, GPU, ASIC, etc.) executing one or more modules of instructions in support of autonomous control of a vehicle or other robotic device. In various embodiments, the photonic apparatus 100 is integrated with a computing device 160, which is embodied within, for example, a vehicle, robotic device (e.g., drone, etc.), or other mobile computing platform. Thus, the results provided by the photonic apparatus 100 in regards to observations of the surrounding environment 120 may facilitate obstacle detection/avoidance, path planning, and other functions in support of autonomous control of the vehicle. In further aspects, the photonic apparatus 100 is integrated with a semi-autonomous vehicle or an advanced driving assistance system (ADAS) to provide perceptions about the surrounding environment 120. In still further aspects, the photonic apparatus 100/computing device 160 are statically mounted on a utility pole at an intersection, along a highway, as a surveillance device mounted to a building or in a similar location, and so on. Thus, the photonic apparatus 100 may be separately implemented to perform functions such as motion detection, intrusion detection, facial recognition, roadway monitoring, and so on. In general, the photonic apparatus 100 improves edge computing through the noted advantages and, thus, may be implemented in various edge computing devices to realize edge computing improvements.

Figure 3:
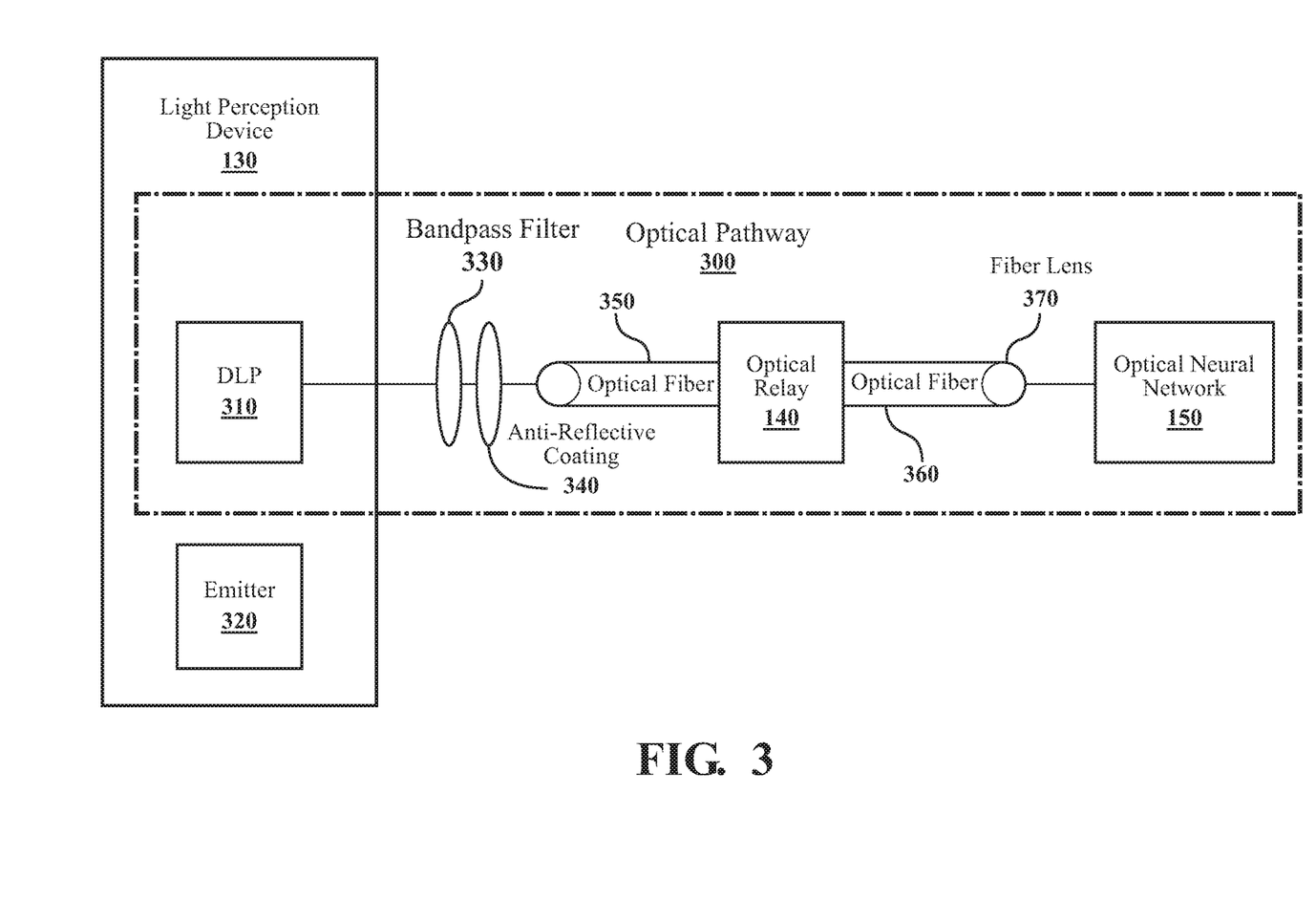
FIG. 3 is a block diagram illustrating one embodiment of an optical pathway integrated with a perception device.

With reference to FIG. 3, one embodiment of an optical pathway 300 as may be implemented in combination with elements of FIG. 1 is further illustrated. As shown in FIG. 3, the optical pathway 300 is an example shown for a single emitter of the light perception device 130 (e.g., LiDAR sensor). The optical pathway 300 is effectively a detector of the device 130 with built-in processing capabilities. Accordingly, the device 130 is illustrated as including a digital light processor (DLP) 310 and a single emitter 320. In alternative approaches, the device 130 can substitute other light processors for the DLP 310 as outlined subsequently. Additionally, it should be appreciated that in implementation, the device 130 may include multiple sets (e.g., 8, 32, 64, etc.) of emitters 320 and/or DLPs 310. In either case, the emitter 320 generates and transmits the light 110 into the surrounding environment 120. As previously mentioned, the emitter 320 can produce the light 110 with defined characteristics such as wavelength, phase, and so on.

The device 130 may alternatively substitute the DLP 310 for a separate type of light processor that is embedded in the optical fiber as an electro-optic switch, fiber modulator, etc. In one approach, the device 130 alternatively implements the DLP 310 as a spatial light modulator in conjunction with a polarizer, a Pockel's cell, an electro-optic modulator (EOM) (e.g., an electro-optic crystal), or another suitable gating mechanism that focuses (e.g., switches) reception to actively time the provided light 110. Furthermore, the DLP 310, in one or more embodiments, is a DLP array that operates on all inputs into the photonic apparatus 100. The DLP 310 or other light processor as may be substituted receives the reflected light 110 and provides the light 110 to a set of optics including the optical relay 140. In general, the DLP 310 or other light processor functions to clock reception of the light 110 in coordination with transmission of the light 110 by the emitter 320 such that the DLP 310/light processor permits the reflected light 110 to enter the optical pathway 300 according to a particular clocking while excluding other ambient noise/signals.

In either case, the device 130 provides the light 110 that is gated according to transmission by the emitter 320 to subsequent components within the optical pathway 300. As illustrated in FIG. 3, the optical pathway 300 can include one or more intervening optics between the DLP 310 and the optical relay 140. For example, as illustrated, the optical pathway 300 includes a bandpass filter 330 and a lens or other optic with an anti-reflective coating 340. In one embodiment, the bandpass filter 330 performs additional conditioning on the light 110 to filter noise from the optical signals while the lens and coating 340 generally function to pass the light 110 into optical fiber 350. The optical fiber 350 maintains the optical pathway 300 into the optical relay 140, which further adapts the light 110 as discussed previously in relation to FIG. 2. An output of the optical relay 140 is connected with an additional optical fiber 360 that guides the light 110 into the ONN 150 via a fiber lens 370.

The connection between the optical fiber 360 and the ONN 150 may be a fiber to silicon photonics waveguide transition, a fiber-to-fiber connection, or another suitable pathway that maintains the light 110 as an analog optical signal and that is generally dependent on an implementation of the ONN 150 (e.g., photonic integrated circuit (PIC), fiber bundle, etc.). The ONN 150, in one arrangement, performs optical processing on the light 110 according to a deep learning algorithm and by using optical components. Thus, the ONN 150 can include, in one or more arrangements, a photonic integrated circuit (PIC), a fiber optic bundle, a set of optical gratings (e.g., multiple groove gratings), a set of optical freespace elements, a set of beam splitters, a set of phase shifters (e.g., liquid crystal phase shifters, electro-optic phase shifters, etc.), an array/mesh of Mach-Zehnder interferometers, and so on.

In general, the ONN 150 can include a combination of the noted elements in particular arrangements to achieve the functionality of artificial neural networks (ANNs) such as convolutional neural networks, recurrent neural networks, long short-term memory (LSTM) networks, autoencoder networks, deconvolutional networks, support vector machines (SVMs), and so on. Moreover, the ONN 150 generally provides an output (i.e., result) of processing to a photoreceiver/detector to perform optical to electrical conversion of the final result.

Figure 4:
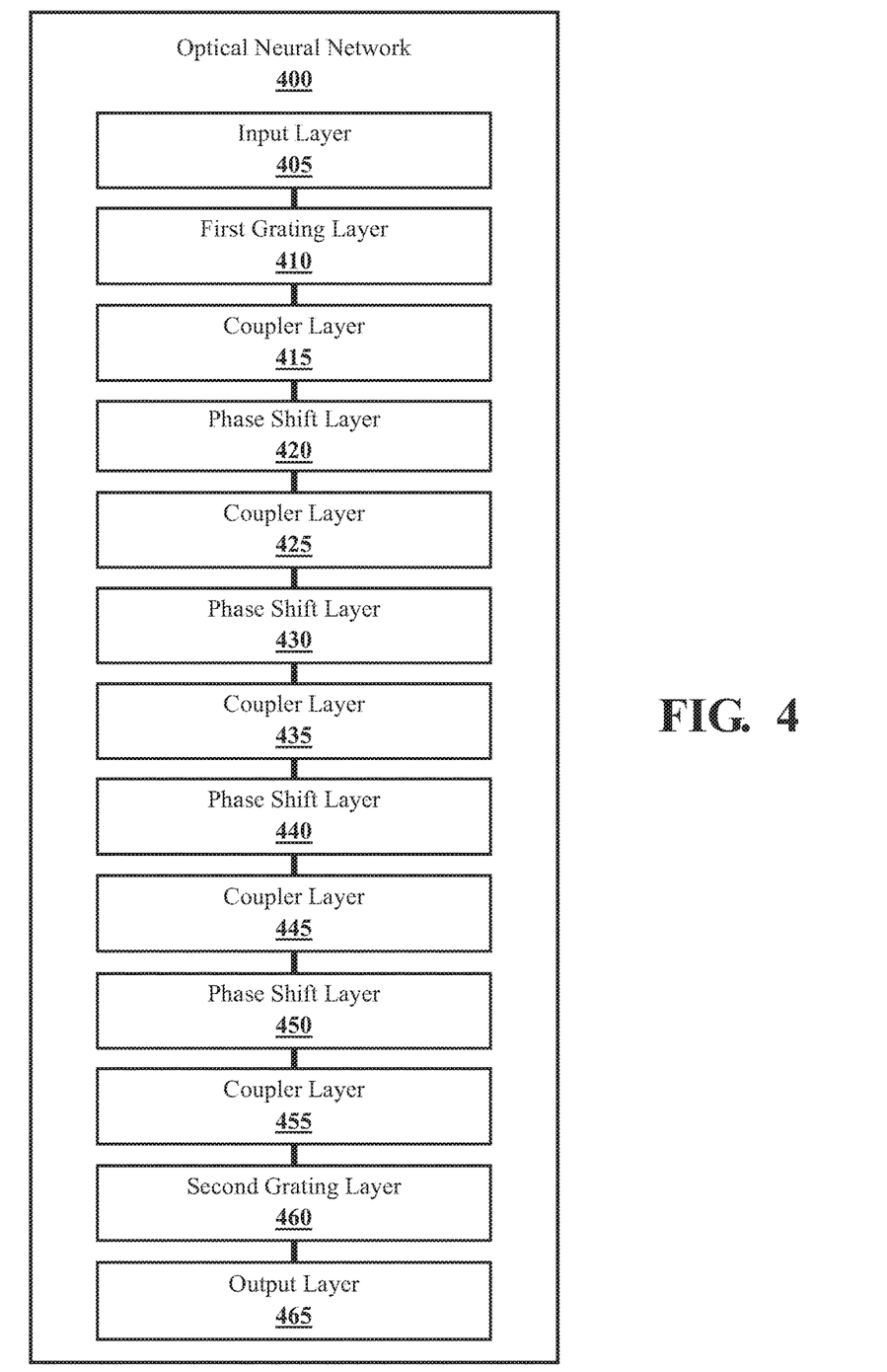
FIG. 4 is a diagram illustrating one embodiment of an optical neural network.

As one example of an implementation of the ONN 150, consider FIG. 4, which illustrates an optical neural network 400. It should be appreciated that while the optical neural network 400 is discussed in relation to the photonic apparatus 100, the ONN 400 can be implemented separately from the photonic apparatus 100. In either case, the ONN 400 includes multiple different layers. In general, the ONN 400 includes two general types of layers. That is, the ONN 400 includes signal handling layers for directing the light 110 within the ONN 400, and optical processing layers for implementing a machine learning algorithm to process the light 110.

The signal handling layers include input layer 405, output layer 465, and grating layers 410 and 460. The input layer 405 includes optical elements such as optical fibers, silicon photonic waveguides, and/or other optical components that direct the light 110 into the ONN 400. In one embodiment, the input layer 405 includes a defined set of inputs that separately correspond with input channels from the device 130. For example, in one approach, the input layer 405 includes eight distinct inputs corresponding with, for example, separate channels of the device 130. Similarly, the output layer 465 can include outputs that correspond to the inputs. Moreover, the output layer 465 may additionally include a photodetector/receiver that receives a result of layers within the ONN 400 processing the light 110 and converts the optical signal into an electronic form.

The signal handling layers further include a first grating layer 410 and a second grating layer 460. The grating layers 410 and 460 are positioned within the ONN to control a direction in which the light 110 propagates. For example, the grating layers 410 and 460 include sets of optical gratings. In one approach, the layers 410 and 460 include a separate set of gratings for each of the input/output channels. The gratings that form the layers 410 and 460 are, in one embodiment, $TiO_2$ double groove gratings attached on top of a $SiO_2$ substrate. In one approach, the double groove of the gratings in the grating layers 410 and 460 have two different widths per period. The two different widths are configured such that the layers 410 and 450 specifically direct the separate channels of the light 110 onto elements of subsequent layers (e.g., couplers and/or outputs). Moreover, the double groove gratings of the layers 410 and 460 are configured to provide transmission of the light 110 with high efficiency (e.g., greater than 90%) and at an angle that facilitates incidence upon a subsequent component.

Accordingly, the grating layers 410 and 460 generally direct the light 110 (e.g., 935 nm wavelength) to a subsequent layer and in an efficient manner. The coupler layers 415, 425, 435, 445, and 455 generally alternate with the phase shift layers 420, 430, 440, and 450. The coupler layers and the phase shift layers function in combination to implement the deep learning algorithm. Moreover, the coupler layers 415, 425, 435, 445, and 455 include, in one or more embodiments, optical grating couplers that are binary dielectric transmission gratings having defined groove parameters that control, at least in part, a transmission efficiency of the light 110 that is incident upon the grating couplers. Additionally, the particular transmission efficiency of the gratings is further dependent on an angle of incidence of the light 110 on the gratings. Accordingly, by varying the noted design parameters and/or the angle of incidence of the light 110 on the respective couplers, the ONN 400 can vary a transmission efficiency of the particular coupler, which effectively functions to adapt weights of the various nodes in the ONN 400 for implementing training of the ONN 400 according to a particular machine learning algorithm and set of training data. In one embodiment, the design parameters of the grating couplers can include groove depth and width for a rectangular grating geometry. Accordingly, depending on selection of groove parameters, the grating couplers can be provided with a varied transmission efficiency.

In a further aspect, the coupler layers 415, 425, 435, 445, and 455 include double groove gratings at edges of the layers to re-direct the light 110 back into the ONN 400 instead of permitting a portion of the light 110 to stray outwardly from an edge. That is, the coupler layers can include one set of double groove gratings at each edge (e.g., a far-right edge and a far-left edge) to retain a portion of the light that is directed toward the edges within the ONN 400. Alternatively, the coupler layers can implement a binary gating, which as a specific ridge-height, at edges of the layers to achieve this function.

Additionally, it should be appreciated that space within the ONN 400 that is between the layers/components is generally freespace (i.e., air) whereas the particular optical components are formed from silicon or a silicon-based material, various selections of metals, plastics, and so on. The phase shift layers 420, 430, 440, and 450 include, in one or more embodiments, sets of liquid crystal phase shifters or other suitable phase shifters that shift separate outputs of the coupler layers 415, 425, 435, 445 prior to the outputs re-converging on subsequent layers. In various approaches, a number of phase shifters per layer may vary depending on, for example, a number of inputs and an order within layers of the ONN 400. In one example, the coupler layers include three or four separate couplers with alternate coupler layers also including the noted double groove gratings for redirecting the light at the edges. As a general matter, the phase shifters within the layers 420, 430, 440 and 450 function to selectively adapt phases of optical signals propagating therein such that adapting the phases according to known values can alter transmission efficiencies of the coupler layers 425, 435, 445, and 455. In this way, the combination of various layers functions to implement a deep learning algorithm.

Figure 5:
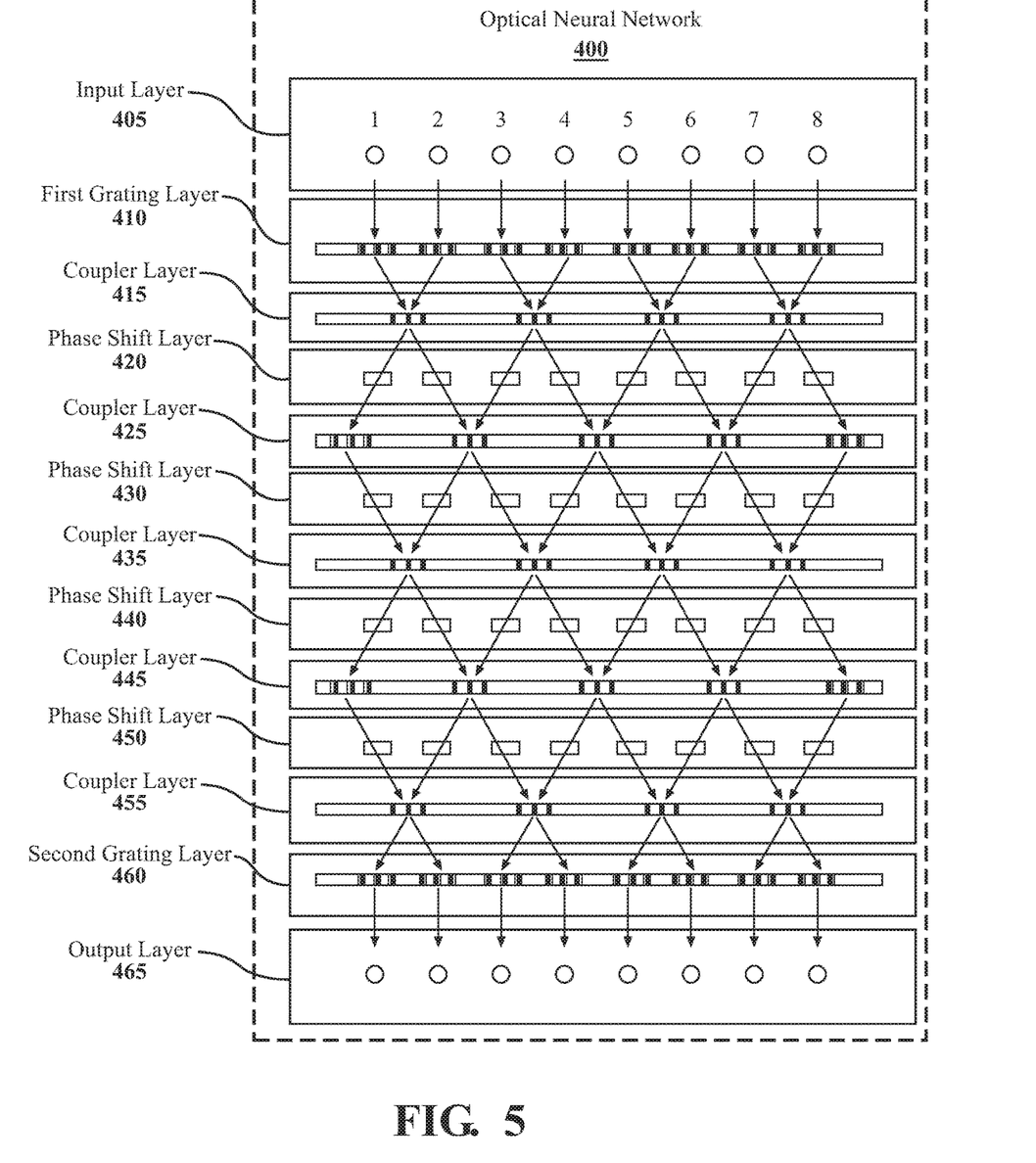
FIG. 5 illustrates one example of an architecture for an optical neural network that uses a combination of gratings and phase shifters.

FIG. 5 illustrates one implementation of the optical neural network 400 of FIG. 4. As shown in FIG. 5 the separate layers are populated with the previously noted optical components in a particular arrangement to achieve a deep learning architecture. As illustrated in FIG. 5, the ONN 400 includes eight inputs corresponding with inputs of the optical perception device 130. Additionally, the grating layers 410 and 460 include a corresponding number of double-groove gratings with different widths. The coupler layers 425 and 445 further include the double-groove gratings at boundary positions along the edges for redirecting the light back into the ONN 400 and also include optical grating couplers positioned therebetween. The coupler layers 415, 435, and 455 further include sets of the optical grating couplers having a form as previously noted. The phase shift layers 420, 430, 440, and 450 include respective sets of phase shifters. It should be appreciated that while the various layers are shown with a specific number of optical components, the number of optical components may vary according to a number of inputs for an implementation. As an additional note, the light 110 propagating through the ONN 400 as illustrated in FIG. 5 is represented by the lines with arrows indicating a direction of propagation and is generally of a particular wavelength such as 935 nm.

Figure 6:
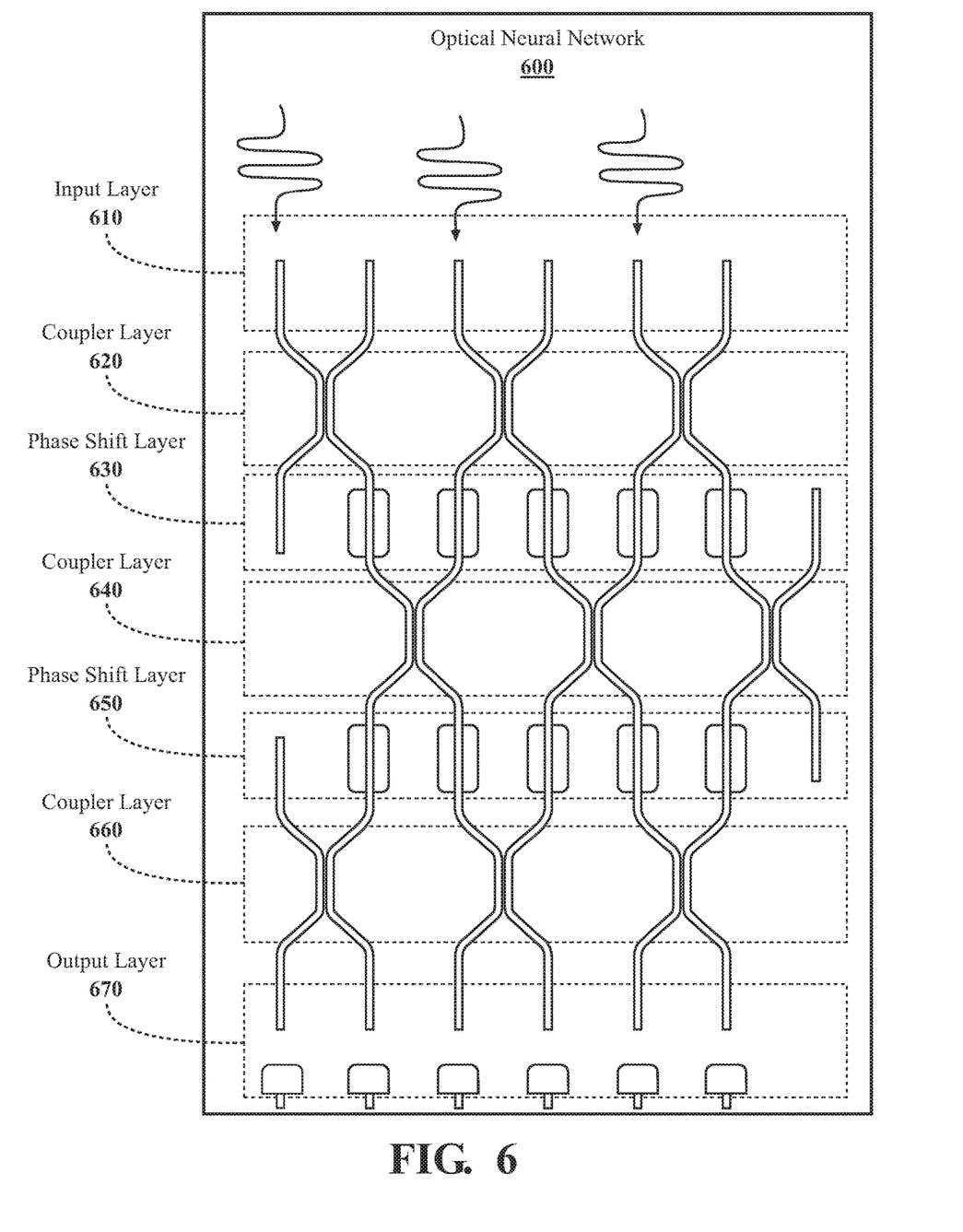
FIG. 6 illustrates an additional example architecture for an optical neural network.

FIG. 6 illustrates a further embodiment of an ONN 600 as may be implemented within the optical pathway 300. As an initial note, the ONN 600, as shown in FIG. 6, is an illustrative embodiment of an ONN that uses the noted components and is not a comprehensive diagram. That is, as illustrated, the ONN 600 is missing one or more connections and/or components but generally embodies the format of such a configuration. Accordingly, the ONN 600 includes a collection of alternating layers similar to the layers of the ONN 400. However, the ONN 600 is not comprised of freespace with optical elements but instead includes silicon photonic waveguides formed into layers of couplers and phase shifters that form a mesh of Mach-Zehnder interferometers.

As shown, the ONN 600 includes an input layer 610, coupler layers 620, 640, 660, phase shift layers 630, 650, and an output layer 670. In general, the input layer 610 receives the light 110 (e.g., 1550 nm) from the optical relay 140 and provides the light 110 into the ONN 600. The coupler layers 620 are, for example, coupled silicon photonic waveguides that function to couple light being propagated therein but also to split the light 110 between subsequent branches. Thus, the couplers also act as beam splitters to form the mesh of Mach-Zehnder interferometers. In general, the mesh of Mach-Zehnder interferometers is repetitively formed from the beam splitters/couplers, and the phase shifters with each unit including at least, for example, two beam splitters and two phase shifters. However, because of the interlinked nature of the architecture, as shown in FIG. 6, the mesh of Mach-Zehnder interferometers (MZIs) may not include distinct Mach-Zehnder interferometers but rather the noted mesh/concatenated set of interferometers where components are shared. In various approaches, the particular architecture may vary and include differing numbers of MZIs.

The phase shift layers 630 and 650 include electro-optic phase shifters, MEMs-based phase shifters, and/or thermo-optic phase shifters formed about the waveguides. In one embodiment, the phase shifters within the various phase shift layers 630 and 650 are generally adjustable to vary weights which affect interference of the light 110 at different couplers/splitters thereby selectively transmitting the light 110 via different nodes to implement the deep learning algorithm. Of course, in further approaches, the ONN 600 may include additional alternating layers and varied arrangements of the optical elements within the layers. The noted components are configured to generally function to decompose unitary matrix operations into sets of phase shifters and beam splitters and perform matrix multiplications by manipulating splitting ratios to add or remove light relative to a baseline.

The output layer 670, as illustrated, includes photoreceivers that ultimately convert the result produced by the ONN 600 into an electronic form for subsequent use by an electronic computing device. In one or more embodiments, the computing device (e.g., device 160) includes an electronic processor operably connected with the output layer 670 to acquire the result in the electronic form (e.g., as electrical signals encoding digital bits). The computing device, in one embodiment, further includes a memory communicably coupled to the electronic processor and storing a module that includes instructions when executed by the electronic processor cause the electronic processor to control a vehicle according to the result. That is, the computing device may be a controller within a vehicle that uses inputs from the photonic apparatus 100 to compute decisions about trajectories or other control functions for a vehicle.

Accordingly, the photonic apparatus 100, as disclosed herein, illustrates how an optical perception/sensing and processing pathway are integrated into a single device without performing intermediate conversion to an electronic format. Thus, the disclosed optical pathway provides a continuous and uninterrupted pathway for the propagation of optical signals that not only receives the reflected light from the surrounding environment but also processes the optical signals in an original format thereby improving throughput while also conserving energy to provide machine perception processing over the sensor data and within a mobile/edge computing device.

FIG. 1 will now be discussed in further detail as an example environment within which the system and methods disclosed herein may operate. The photonic apparatus 100 can include one or more processors. In one or more arrangements, the processor(s) can be a main processor of the photonic apparatus 100. For instance, the processor(s) can be an electronic control unit (ECU). The photonic apparatus 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the photonic apparatus 100 from transmitting the beam of light and receiving responses thereto. As will be explained below, the photonic apparatus 100 can be a part of a sensor system of a vehicle or other device. The sensor system can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors (e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the photonic apparatus 100 (including any of the elements shown in FIG. 1). The sensor system can acquire data of at least a portion of the external environment of the photonic apparatus 100 (e.g., nearby vehicles, obstacles).

As an example, in one or more arrangements, the sensor system can include one or more radar sensors, one or more LIDAR sensors, one or more sonar sensors, and/or one or more cameras. The processor(s) and/or associated modules (e.g., autonomous driving module) executing thereon can be operably connected to communicate with the various vehicle systems and/or individual components thereof. For example, the processor(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The photonic apparatus 100 and/or associated computing device 160 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An apparatus, comprising:
   a light perception device that perceives light from a surrounding environment of the apparatus; and
   an optical neural network (ONN) connected with the light perception device via an optical relay, the optical neural network configured to perform optical processing on the light according to a deep learning algorithm and using optical components,
   wherein the optical relay includes an amplifier, a polarizer, and a waveplate connected in series to provide the light from the light perception device to the ONN and maintain an optical pathway throughout the apparatus.

2. The apparatus of claim 1, wherein the light perception device is a light detection and ranging (LiDAR) sensor.

3. The apparatus of claim 1, wherein the ONN is embodied within a photonic integrated circuit (PIC).

4. The apparatus of claim 1, wherein the ONN is comprised of one or more of:
   a photonic integrated circuit (PIC),
   a fiber optic bundle,
   a set of optical gratings, and
   a set of optical freespace elements.

5. The apparatus of claim 1, wherein the ONN is comprised of an array of Mach-Zehnder interferometers including a set of phase shifters and a set of beam splitters.

6. The apparatus of claim 1, wherein the ONN implements convolutional neural network (CNN) processing using optical processing components with integrated photonic waveguides connecting and forming portions of the optical processing components.

7. The apparatus of claim 1, wherein the ONN implements an algorithm to perform one or more of: object recognition, object classification, object tracking, and path planning.

8. The apparatus of claim 1, wherein the ONN implements recurrent neural network (RNN) processing.

9. The apparatus of claim 1, further comprising:
   a photoreceiver connected with the ONN to receive a result of the optical processing and to perform an optical to electrical conversion of the result.

10. The apparatus of claim 9, further comprising:
    an electronic processor operably connected with the photoreceiver to acquire the result in an electronic form; and
    a memory communicably coupled to the electronic processor and storing:

a module that includes instructions when executed by the electronic processor cause the electronic processor to control a vehicle according to the result.

11. The apparatus of claim 1, wherein the ONN is comprised of:
a set of optical components forming layers, the layers including alternating layers of optical grating couplers and phase shifters that are configured to process the light according to a deep learning algorithm.

* * * * *